United States Patent [19]
Boone

[11] 3,824,732
[45] July 23, 1974

[54] FISHING LURE
[76] Inventor: Robert L. Boone, P.O. Box 11101, Houston, Tex. 77016
[22] Filed: Sept. 5, 1972
[21] Appl. No.: 286,176

[52] U.S. Cl.............................. 43/42.05, 43/42.19
[51] Int. Cl............................................ A01k 85/00
[58] Field of Search............ 43/42.05, 42.04, 44.88, 43/44.87, 44.9, 44.91, 42.36

[56] References Cited
UNITED STATES PATENTS
| | | | |
|---|---|---|---|
| 668,254 | 2/1901 | Dickinson | 43/44.9 |
| 1,791,316 | 2/1931 | Jordan | 43/42.36 |
| 2,236,353 | 3/1941 | Minser | 43/42.05 |
| 2,419,037 | 4/1947 | Safford | 43/42.05 |

Primary Examiner—Warner H. Camp
Attorney, Agent, or Firm—Pravel, Wilson and Matthews

[57] ABSTRACT

A releasable fishing lure including a base member and hook attached to a fishing line and a lure body having a bore therethrough, the lure body being mounted on the base member with releasable, frictional connection therebetween whereby the lure body is releasable for movement along the fishing line away from the hooked fish.

5 Claims, 7 Drawing Figures

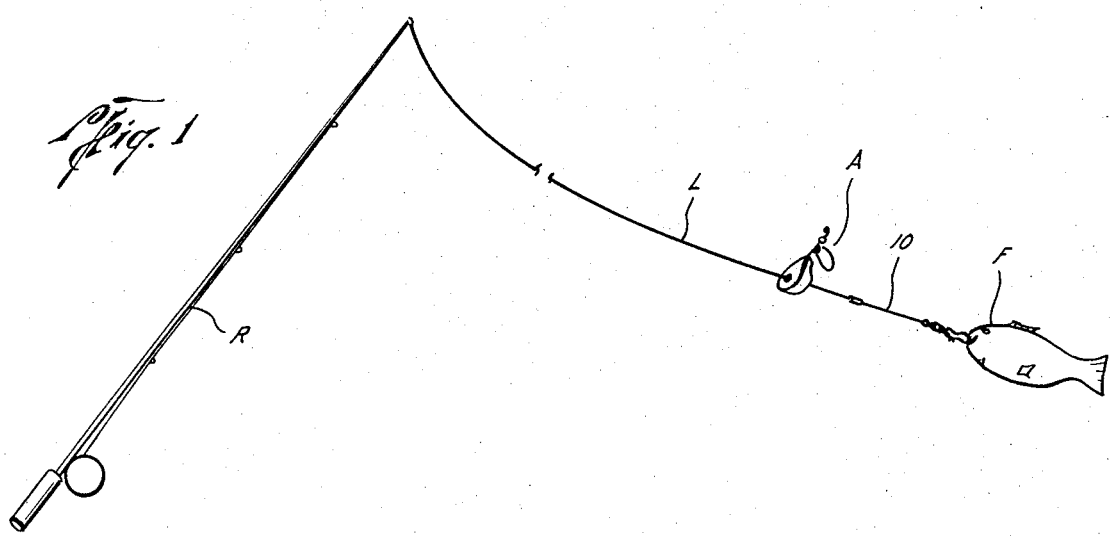
Fig. 1
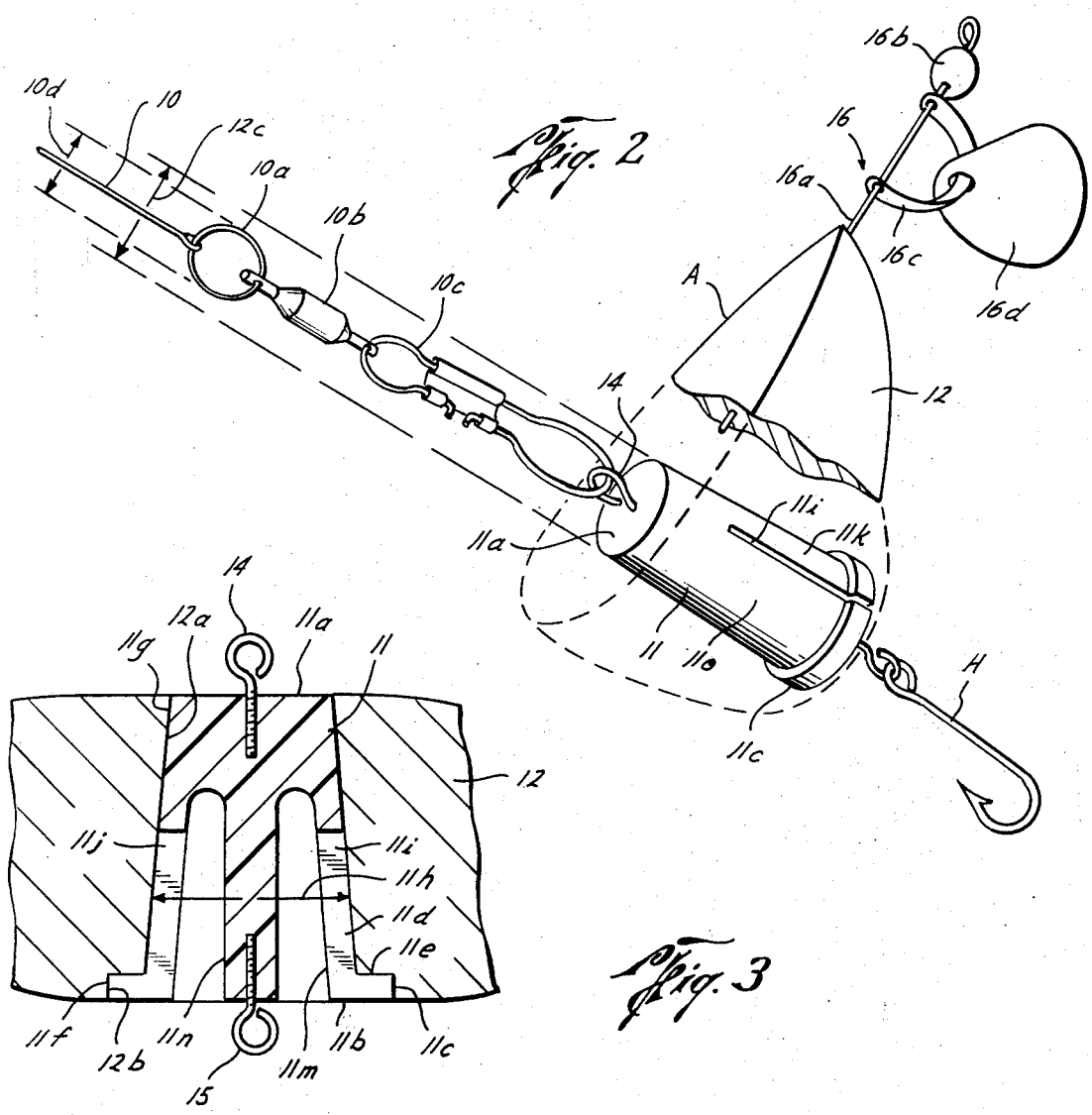
Fig. 2
Fig. 3

PATENTED JUL 23 1974 3,824,732

FISHING LURE

BACKGROUND OF THE INVENTION

The field of this invention is artificial fishing lures.

A problem encountered in artificial bait fishing is losing the fish after the fish has struck the artificial bait or lure. In conventional artificial lures, the lure body is so close to the hook taken by the fish that frenzied movement of the fish against the lure body apparently allows the fish to work or tear free of the hook.

Various U.S. Patents such as Walsh, U.S. Pat. No. 1,972,697, and Grounsell, U.S. Pat. No. 1,434,204, disclose lures wherein the hook and lure body are supposed to separate when the hook is taken by a fish in order to prevent the fish from working against the lure body.

SUMMARY OF THE INVENTION

The present invention relates to a new and improved artificial bait or lure having a lure body which is released for movement along the leader and fishing line when a fish takes the hook and works against the lure body. The releasable fishing lure of the preferred embodiment of this invention includes a base member adapted for attachment to a fishing leader, the base member having a hook mounted thereon. A fishing lure body has a bore therein such that the lure body is mountable over the fishing leader for movement along the fishing leader and the fishing line attached therewith. The base member and the lure body bore cooperate to provide a releasable, frictional connection means therebetween whereby the lure body is released from its mounting with the base member whenever a fish exerts a prying action or other force on the lure body. In one feature of this invention, the base member or centerpiece and the lure body bore both have frusto-conical configurations and the base member is slightly larger in size than the lure body bore such that a frictional connection is formed with the base member inserted in the lure body bore.

BRIEF DESCRIPTION OF THE DRAWINGS

FIG. 1 is a schematic view illustrating the separation of the body of the fishing lure from the base member and hook portions of the lure;

FIG. 2 is an isometric view that is partly in section illustrating the position of the lure body on the base member of the fishing lure of this invention;

FIG. 3 is a sectional view of the frictional fit between the base member and the fishing lure body;

DESCRIPTION OF THE PREFERRED EMBODIMENT

Figure 4:
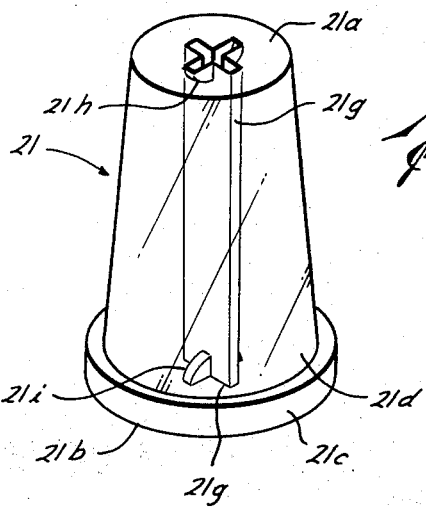
FIG. 4 is an isometric view of an alternate form of the base member that is attached to the fishing leader.

Referring to the drawings and in particular FIG. 1, a fishing rod R and fishing line L are illustrated with a hooked fish F. The artificial, releasable fishing lure A is illustrated in its movement away from the hooked fish F along the fishing line L. Referring in particular to FIGS. 2 and 3, the artificial fishing lure A of the preferred embodiment of this invention is illustrated in its normal arrangement on the fishing line L. Actually, the fishing line L has a conventional fishing leader 10 attached thereto. The leader terminates with a connector arrangement which includes a ring 10a, a swivel 10b connected thereto and a snap connector 10c connected to the swivel 10b. Such fishing leaders as 10 are well known in the art and are very convenient to use since the artificial lures such as A being attached to the leader 10 may be easily exchanged by using the snap connector 10c.

The artificial fishing lure A of the preferred embodiment of this invention is illustrated in FIG. 2 connected to the snap connector 10c. The lure A includes a base member 11 and a body portion 12 releasably mounted over the base member 11 so that the body 12 will be released for movement along the leader 10 and fishing line L whenever a fish F on hook H exerts a releasing force on the body 12.

The base member or centerpiece 11 has a tapered, frustro-conical configuration and includes a top surface 11a and a bottom surface 11b. A circumferential lip 11c extends radially outwardly from the lower end 11d of the centerpiece 11. The circumferential lip 11c is formed by radially extending shoulder 11e and circumferential edge 11f formed therewith. The centerpiece 11 may be made of a fluorocarbon resin manufactured under the trademark "Teflon" by Du Pont de Nemours & Co., an acetol resin manufactured under the trademark "Delrin" by Du Pont de Nemours & Co., nylon or any other suitable material. An eye connector 14 is mounted in upper end 11g of the centerpiece 11 and another eye 15 is mounted at lower end 11d. The upper eye 14 serves to connect the centerpiece 11 with the conventional snap connector 10c and thus with the leader 10 and fishing line L. The lower eye connector 15 mounts the hook H. The eyes 14 and 15 may be molded with the centerpiece itself or may be attached to the ends 11d and 11g by other suitable means.

The lure body 12 includes a tapered, frustro-conically shaped bore 12a adapted to receive the centerpiece 11. The lower end of the bore 12a includes an enlarged or countersunk portion 12b adapted to receive the circumferential lip 11c of the centerpiece 11. The minimum diameter 12c of the bore 12a is greater than the diameter 10d of the leader ring connector 10a such that the body 12 is easily movable over the ring 10a, swivel 10b and snap connector 10c and thus away from the centerpiece 11 and hook H.

As previously mentioned, the configuration of the centerpiece 11 is basically frusto-conical, that is, the diameter of the centerpiece increases from a minimum at surface 11a (which is equal to the diameter of the bore 12c) to a maximum at lower end 11d. Of course, the diameter of the circumferential lip 11c is even greater than the maximum diameter of the lower end 11d of the centerpiece 11. The diameter of centerpiece 11, particularly at lower end 11d, is greater than a corresponding diameter of bore 12a. For example, the diameter 11h of the centerpiece 11 is greater than the diameter of lure body bore 11a of the same locus. In this manner the centerpiece 11 is compressed when inserted into the bore 12a of the lure body 12. In order to facilitate compression of the centerpiece 11 within the bore 12a of the lure body 12, slots 11i and 11j are machined into the lower end 11d. The slots 11i and 11j divide the lower centerpiece portion 11d into bending portions 11k and 11o. Whenever the lure body 12 is placed over the centerpiece 11, the bending portions 11k and 11o are bent or moved towards each other thereby allowing the lower portion 11d of the centerpiece 11 to compress within the slot 11a. And, since the centerpiece 11 is formed of a resilient material, these bending portions 11k and 11o are continually urged outwardly due to the resilient nature of the material such that a frictional connection exists between the centerpiece 11 and the lure body bore 12a. A plurality of holes such as 11m and 11n are bored into the lower portions 11b of each of the bending portions 11k and 11i in order to facilitate compression of the bending portions within themselves. In this manner, the entire lower portion 11d of the centerpiece 11 is resiliently compressed into the bore 12 in order to provide a more secure frictional connection between the centerpiece 11 and the lure body bore 12a.

The fishing lure body 12 can be formed into any suitable shape so long as it includes the frustro-conical bore portion 12a. A conventional spinner generally designated as 16 is mounted onto the lure body 12. A spinner shaft 16a is molded into the lure body upon formation thereof and mounts a bearing bead 16b. A clevis 16c is rotatably mounted onto the spinner shaft 16a and a conventional spinner 16d is mounted onto the clevis.

The fishing lure body 12 is formed of a lead alloy in the preferred embodiment of this invention; however, it is understood that the lure body 12 can be made of any suitable material. Preferably, the lure body 12 is formed of a heavier material having an overall weight comparable to a lead alloy type lure body so that, when released, the lure body 12 will tend to weight down the line and be moved along the fishing line L by gravity.

Figure 5:
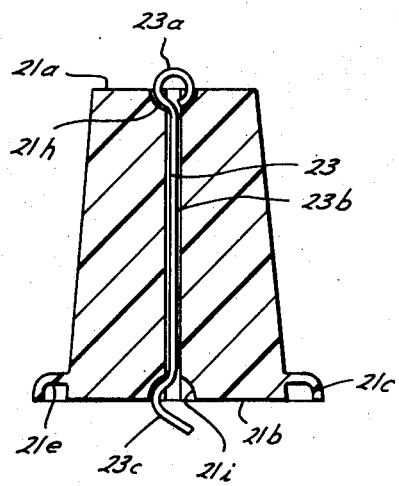
FIG. 5 is a sectional view of the alternate embodiment of the base member illustrating the placement of the double eye connector therein.
Figure 6:
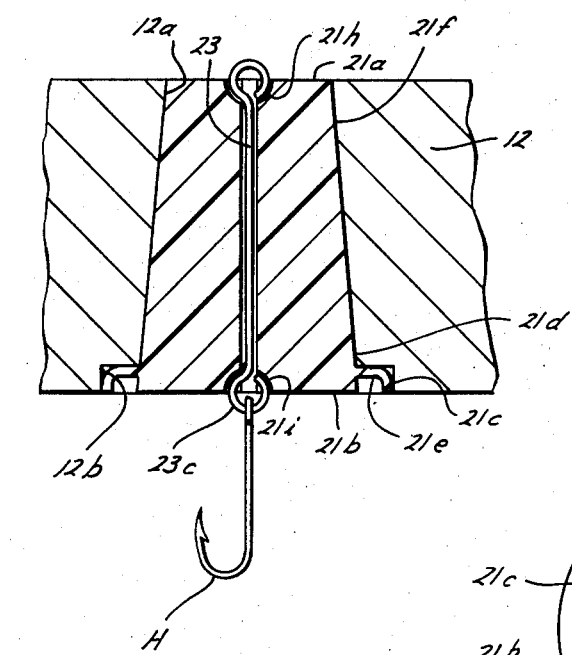
FIG. 6 is a sectional view of the alternate embodiment of the base member frictionally mounted in the lure body bore.
Figure 7:
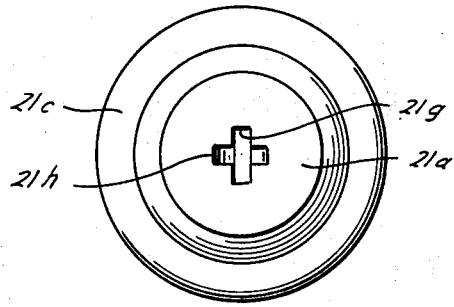
FIG. 7 is a top view of the alternate form of the base member.

Referring to FIGS. 4–6, an alternate embodiment generally designated as 21 of the centerpiece is illustrated. The alternate centerpiece 21 is tapered and generally frustroconical in configuration and includes a top surface 21a and a bottom surface 21b. A circumferential, flared lower lip 21c is provided at lower end 21d of the centerpiece. In centerpiece 21, the circumferentially extending lip 21c is generally L-shaped in configuration and is formed by a circumferential groove 21e. The diameter of the centerpiece 21 at any point, excluding the circumferential lip 21c is substantially equal to the corresponding diameter of the bore 12a such that the lower and upper portions 21d and 21f, respectively, of the centerpiece 21 fit within the bore 12a without a substantial compressing of the centerpiece 21. However, the effective diameter of the lower, circumferential lip 21c is greater than the diameter of the countersunk portion 12b of the bore 12 such that the lip 21c is resiliently urged against the countersunk portion 21c. In this manner, the lip 21c serves to form a releasable, frictional connection between the countersunk portion 12b and the centerpiece 21 such that the lure body 12 is released from connection with the centerpiece 21 whenever a fish F on hook H exerts sufficient force. The centerpiece 21 is also made of resilient materials such as Teflon or Delrin, previously described, such that the lower circumferential lip 21c is compressed into a resilient, frictional engagement with the countersunk bore portion 12b, the force of the frictional engagement therebetween being sufficient to hold the lure body in position on the center piece 21 during casting of the rod while allowing release of the lure body 12 under the force exerted by a fish F on hook H.

A double eye generally designated as 23 is mounted with the centerpiece 21 for connecting the centerpiece to the hook H and the snap connector 10c of the fishing leader 10. An elongated opening 21g extends from the top surface 21a to the bottom surface 21b of the centerpiece 21. In the preferred embodiment illustrated herein, the elongated opening 21g is rectangular in cross section. A curved or semi-circular recess 21h is machined in the top surface 21a at an angle or approximately 90° with respect to the elongated opening 21h. Similarly, a curved or semi-circular recess 21i is machined in the bottom surface 21b of the centerpiece 21, also in a position approximately perpendicular to the position of the elongated opening 21g.

The double eye connector 23 is mounted within the recesses 21h and 21i in the following manner. An upper eye 23a is formed in the otherwise straight rod 23b. The connector 23 with the upper eye 23a formed therein is then placed or inserted through the elongated opening 21g and the upper eye 23a is positioned or seated within the upper recess 23a. With the upper eye 23a seated in the upper recess 21h, the lower eye 23c with the hook H thereon is then formed within the lower recess 21i. The eyes 23a and 23c may be formed with the use of conventional wire-working tools.

If desired, the lower eye 23c may be partially formed or curved to a position such as illustrated in FIG. 5 prior to the placement of the double eye connector 23 in the centerpiece 21. Since the elongated opening 21g is rectangular in cross section, the partially formed lower eye 23c of FIG. 5 can be inserted through the opening 21g. After the connector 23 is inserted through the elongated opening 21g, the connector 23 is rotated 90 degrees such that the upper, completely formed eye 23a is positioned within the upper curved recess 21h. Then, the bottom eye 23c is bent to its completed position as illustrated in FIG. 6. Of course, the hook H is placed onto the lower eye prior to completion of the bending. One of the advantages of using the double eye connector 23 is that the forces exerted by the fish F on the hook H are transmitted directly to the leader 10 and fishing line L, with very little stress or strain actually being placed on the centerpiece 21.

In the operation and use of the releasable fishing lure A of the preferred embodiment of this invention, the lure body 12 and centerpiece 11 are connected together to form a lure which is attached by upper eye 14 to snap connector 10c of the fishing leader 10, which is in turn connected to the fishing line L of the fishing rod R. Whenever a fish F strikes the hook H and exerts sufficient force during its movement to pry or work the lure body 12 away from its frictional connection with the centerpiece 11, the lure body 12 moves away from the fish on the hook H down the leader and the fishing line L. The fish F may cause the release of the lure body 12 from frictional engagement with the centerpiece 11 by jerking the hook H or by actually prying or working against the lure body 12.

Referring to FIGS. 1–3, the frictional connection is provided by slightly oversizing the centerpiece 11 wi-threspect to the bore 12a of the lure body such that portions such as 11k and 11o are resiliently compressed against the bore 12a and remain in frictional engagement therewith until sufficient force is exerted to release the body 12. In the use of the centerpiece 21, the frictional engagement between the centerpiece 21 and the bore 12a of the lure body 12 is provided by the circumferentially extending lip 21c which is resiliently compressed against the countersunk bore portion 12b.

The foregoing disclosure and description of the invention are illustrative and explanatory thereof, and various changes in the size, shape, and materials as well as in the details of the illustrated construction may be made without departing from the spirit of the invention.

One of the significant advantages of this invention is that the artificial fishing lure A can be utilized with a conventional leader 10 so that the convenience of the snap connector can be utilized. In this manner, various types and sizes of releasable artificial lures can be easily placed onto the fishing line L and the leader 10 by simply using the snap connector 10c.

I claim:

1. A releasable fishing lure, comprising:
a base member adapted for mounting in a fishing line, said base member having a hook movably mounted therewith;
a lure body having a bore internally therein such that said lure body is adapted for movement along said fishing line;
said base member and said lure body bore cooperating to mount said base member totally within said lure body and to provide a releasable, frictional connection means therebetween for releasing said lure body from connection with said base member for movement along said fishing line away from said hook when a fish is on said hook; and
said base member being a resilient material and having a portion with a diameter greater than the corresponding bore diameter of said lure body such that said base member portion mounts said base member in releasable, frictional engagement with said lure body bore.

2. The structure set forth in claim 1, wherein:
said base member portion has longitudinal slots extending partially along said base member portion forming plural bending portions therein to facilitate compression of said base member portion against said lure body bore to provide said releasable connection.

3. The structure set forth in claim 1, wherein:
said fishing line has a fishing leader and connector means having a ring, a swivel, and a snap connector, said fishing line being attached thereto; and
said lure body is sufficiently large to allow said lure body to move over said connector means and along said leader.

4. The structure set forth in claim 1, including:
said base member having top and bottom surfaces said top and bottom surfaces each having a mounting recess therein;
an elongated opening extending between said top and said bottom surfaces; and
a double eye connector extending through said elongated opening, one eye being mounted in said top recess and another eye being mounted in said bottom recess whereby said double eye connector is secured with said base member.

5. A releasable fishing lure, comprising:
a base member adapted for mounting in a fishing line, said base member having a hook movably mounted therewith;
a lure body having a bore therein such that said lure body is adapted for movement along said fishing line, said lure body bore having an enlarged, countersunk portion; and
said base member being a resilient material and having a resilient lip portion with a diameter greater than said lure body bore countersunk portion such that said base member resilient lip portion mounts said base member in releasable, frictional engagement with said lure body bore for releasing said lure body from connection with said base member for movement along said fishing line away from said hook when a fish is on said hook.

* * * * *